United States Patent
Hajiyev et al.

(10) Patent No.: US 11,044,534 B2
(45) Date of Patent: *Jun. 22, 2021

(54) METHOD IN SUPPORT OF VIDEO IMPRESSION ANALYSIS INCLUDING INTERACTIVE COLLECTION OF COMPUTER USER DATA

(71) Applicant: Realeyes OÜ, Tallinn Harju (EE)

(72) Inventors: Elnar Hajiyev, Morden (GB); Martin Salo, London (GB)

(73) Assignee: Realeyes OÜ, Tallinn Harju (EE)

( * ) Notice: Subject to any disclaimer, the term of this patent is extended or adjusted under 35 U.S.C. 154(b) by 145 days.

This patent is subject to a terminal disclaimer.

(21) Appl. No.: 16/195,050

(22) Filed: Nov. 19, 2018

(65) Prior Publication Data

US 2019/0090031 A1  Mar. 21, 2019

Related U.S. Application Data

(63) Continuation of application No. 14/911,643, filed as application No. PCT/EP2014/067452 on Aug. 14, 2014, now Pat. No. 10,194,213.

(30) Foreign Application Priority Data

Aug. 15, 2013 (GB) .................................. 1314636

(51) Int. Cl.
*H04N 21/81* (2011.01)
*H04N 21/25* (2011.01)
(Continued)

(52) U.S. Cl.
CPC ......... *H04N 21/812* (2013.01); *H04N 21/251* (2013.01); *H04N 21/25883* (2013.01);
(Continued)

(58) Field of Classification Search
CPC ........... H04N 21/251; H04N 21/25883; H04N 21/42201; H04N 21/4223; H04N 21/4415;
(Continued)

(56) References Cited

U.S. PATENT DOCUMENTS

2010/0070783 A1* 3/2010 Okamoto ........... H04N 21/4223 713/310
2011/0029666 A1* 2/2011 Lopatecki ........ H04N 21/44222 709/224
(Continued)

FOREIGN PATENT DOCUMENTS

CN  101917585 A  12/2010
CN  102566740 A  7/2012
(Continued)

*Primary Examiner* — Rong Le
(74) *Attorney, Agent, or Firm* — Leason Ellis LLP

(57) ABSTRACT

A method of initiating and controlling computer user behavioural data (e.g., emotional state information) collection and processing within the structure of a video ad response provides an analysis of video ad effectiveness as a result of interaction with the computer user. A behavioural data collection and processing module is caused to nut by the execution of a Video Ad Standard Template (VAST) compliant video ad response in a video player. The data collection and processing module may be obtained by calling a resource identifier contained in the video ad response, or by providing an executable application within the served video ad response itself. In more particular methods according to the invention, processing of collected data is managed so as to improve the efficiency of media playback at the client computer and communications with remote servers.

20 Claims, 6 Drawing Sheets

(51) Int. Cl.
*H04N 21/258* (2011.01)
*H04N 21/442* (2011.01)
*H04N 21/45* (2011.01)
*H04N 21/422* (2011.01)
*H04N 21/4788* (2011.01)
*H04N 21/466* (2011.01)
*H04N 21/4415* (2011.01)
*H04N 21/4223* (2011.01)

(52) U.S. Cl.
CPC ... *H04N 21/4223* (2013.01); *H04N 21/42201* (2013.01); *H04N 21/442* (2013.01); *H04N 21/4415* (2013.01); *H04N 21/4532* (2013.01); *H04N 21/4667* (2013.01); *H04N 21/4668* (2013.01); *H04N 21/4788* (2013.01)

(58) Field of Classification Search
CPC ............. H04N 21/442; H04N 21/4532; H04N 21/4667; H04N 21/4668; H04N 21/4788; H04N 21/812
See application file for complete search history.

(56) References Cited

U.S. PATENT DOCUMENTS

| | | |
|---|---|---|
| 2011/0173071 A1 | 7/2011 | Meyer et al. |
| 2012/0054777 A1* | 3/2012 | Xiques ................. H04N 21/414 719/318 |
| 2012/0072939 A1* | 3/2012 | Crenshaw .......... H04N 21/4415 725/12 |
| 2012/0222057 A1* | 8/2012 | Sadowsky ............ H04N 21/251 725/10 |
| 2013/0095864 A1* | 4/2013 | Marovets ................ H04L 51/08 455/466 |

FOREIGN PATENT DOCUMENTS

| | | |
|---|---|---|
| CN | 103024521 A | 4/2013 |
| JP | 2009005094 A | 1/2009 |
| WO | 2008138144 A1 | 11/2008 |

\* cited by examiner

METHOD IN SUPPORT OF VIDEO IMPRESSION ANALYSIS INCLUDING INTERACTIVE COLLECTION OF COMPUTER USER DATA

CROSS-REFERENCE TO RELATED PATENT APPLICATIONS

This application is a Continuation of U.S. patent application Ser. No. 14/911,643, filed Feb. 11, 2016, which is a U.S. National Phase Application under 35 U.S.C. § 371 of International Patent Application No. PCT/EP2014/067452, filed Aug. 14, 2014 which claims priority to Great Britain Patent Application No. 1314636.0, filed Aug. 15, 2013, the contents of which are hereby incorporated by reference in their respective entireties.

FIELD OF THE INVENTION

The invention concerns the analysis of video impressions and relates to the interactive collection of data concerning a computer user in support of such analysis. In particular, the invention relates to the collection and processing of information relating to a computer user's behaviour at a client computer, e.g. while watching a video or engaging in an activity, for transmission to a remote server in an efficient manner, in support of an analysis of impressions of the computer user, as is particularly useful in the analysis of the effectiveness of a video ad.

BACKGROUND TO THE INVENTION

From a commercial viewpoint, it is important to be able to evaluate the performance of content provided online, e.g. advertisement ("ad"), game, music video, television show, etc. It is common to provide a system for computer users to manually rate content, e.g. by selecting a suitable rating value (e.g. a number of stars). It is also common to provide questionnaires or interviews as part of an ad effectiveness tracking scheme.

More recently, techniques for measuring a computer user's emotions, e.g. by facial features tracking or the like, have been incorporated into methods of evaluating the performance of video content. For example, an imaging unit, such as a webcam, can be used to capture the facial features of a computer user as they watch video content. The captured images can be processed to yield information about the computer user's emotions at certain points in the video, which is valuable feedback on the performance of the video.

The video and the captured images may be transmitted over the Internet, whereby the feedback may be automatically gathering from a plurality of remote computer users. For example, US 2012/0222057 discloses system in which a video is embedded in a web-enabled interface, which is arranged to collect mental state data for a computer user who watches the embedded video. The web enabled interface itself can be distributed, e.g. by sending an appropriate URL to a plurality of prospective viewers.

US 2011/0029666 discloses a passive user behaviour monitoring system in which a data collection agent is loaded to a video player and/or to a web page that displays a video clip.

US 2012/0072939 discloses a system and method for measuring audience reaction to video content by capturing images of each audience member via a webcam or the like.

SUMMARY OF THE INVENTION

At its most general, the present invention proposes the provision of computer user behavioural data collection functionality within the structure of a video ad response in support of the problem of gauging the effectiveness of content provided online on the computer user at each client computer at which the content is played. The invention may thus enable computer user behavioural data (e.g. including emotion state data) to be collected for media content (e.g. video or audio) regardless of the type of video player used to play the video content.

Herein, the term "video ad response" is used to mean the response served from an ad server following a call from a video player, which contains the necessary information, e.g. media files, for displaying video content. The computer user behavioural data collection functionality may be an interactive web application which takes the place of a video ad within the video ad response, or through which a video ad is played.

Herein, the term "behavioural data" is used to mean any data concerning the activity or status of the user. It may include emotion state data, i.e. information indicative of the user's emotion at any given time. Emotion state data may be obtained in any way, e.g. from facial images or other physiological indicators obtained via a webcam. Behavioural data may also include data concerning the user's interaction with the computer, e.g. audio data, click data or other data indicative of the user's interest in a portion of the display. In addition to behavioural data, the invention may also provide for the collection, processing, and transmission of other user data, e.g. indicative of other details about the user, such as gender, age, location, etc.

Herein, the term "remote server" and, more generally, "server" is used to mean a computer having at least one processor that executes instructions therein received from a memory store (e.g., RAM) in order to implement functionality useful in connection with one or more embodiments of the invention. The server further includes network interface components comprising hardware configured to enable communications over a network between the server and between one and a plurality of local computers at which computer user behavioural data is being captured. By way of example and not limitation, the communications can comprise data packets constructed in accordance with a user datagram protocol (UDP) or an Internet protocol (IP).

As noted, the computer user behavioural data collection functionality in accordance with the present invention can comprise additional "behavioural data" which concerns temporal information concerning the data being collected at the local computer prior to being transmitted to the remote server.

Thus, according to the invention and in furtherance of the problem being addressed in the field of delivering online content, there is provided a method of collecting computer user behavioural data comprising: receiving, e.g. at an ad server from a video player running on a client computer, a call for a video ad response; serving a video ad response to the client computer; executing the video ad response in the video player on the client computer; and, upon execution of the video ad response, executing an executable data collection and processing module at the video player to collect and process behavioural data during playback of media at the client computer. The video ad response may include code for triggering the executable data collection and processing module upon execution of the video ad response in the video player. In this method, the video player provides the runtime environment for the data collection and processing module. The collection of computer user behavioural data may thus be better integrated in the video playback process.

In a more specific aspect of the present invention, data packets may be constructed at a client computer from which computer user behavioural data is collected in connection with the display of online content. The construction of the data packets includes local processing of the collected computer user behavioural data utilising the processor of the client computer, configured by code executing therein, in order to transform the collected data from a raw image capture state, say, from a web camera associated with the local computer, in to a packetized structure which is compatible with a streaming data protocol for transmission over a network, such as a TCP/IP network.

In a still more particular aspect of the invention, the collected data may undergo additional processing, before transformation into a packetized structure, in order to coordinate the captured computer user behavioural data with moments or segments of the video provided to the local computer during media playback, including at least moments or segments during media playback of a video ad at the local computer. Such processing includes instructions executing in the processor of the local computer which synchronize the images being captured to a temporal location within the media being played back at the client computer, such as by associating a time code or range of time codes of the video with the captured computer user behavioural data. The synchronization can be important to solve latency problems associated with the reception of streamed content at the local computer, associated with local processes (such as those which might change the timing of media playback relative to the transmission of streamed content to the local computer), and events at the local computer which also can affect the time window of media playback (e.g., as one non-limiting example, the user pauses or rewinds playback).

The additional processing in accordance with this aspect of the invention causes temporal information concerning the computer user behavioural data to be included among the data packets being transmitted to the remote server, in addition to the transmission of the computer user behavioural data itself to the remote server.

In further more particularized aspects, the time codes for the moments or segments during which computer user behavioural data is being captured can comprise time offsets relative to a video ad, and optionally relative to other video content being played back, in the media playback application.

In still further aspects of the invention, client computers are configured to more efficiently utilize their resources so as to minimize interruption of media during playback. In this regard, system components are monitored and their performance or values are utilized in determinations as to when certain local processing is to be performed. As such, processing of computer user behavioural data can be performed dynamically (starting and stopping) in view of the performance capabilities of the client computer on which the processing is being performed and in further view of connectivity between the client computer and the network to which it is connected.

The collected behavioural data may be the raw data, e.g. images, audio, which can be analysed (in the computer and/or externally) to obtain behavioural information. The processing of the collected behavioural data may include several sub-processing steps, at least one which transforms the interactive data that has been collected into data packets suitable for transmission to a remote server, and more preferably to include temporal information related to the video playback and the moment or segment that was being played at the client computer during the collection of the computer user behavioural data.

The media (e.g. video content or audio content) that is played back during the collection of behavioural data may be provided by an executable media file in the video ad response. Alternatively, the video content that is played back during the collection of images may be served separately from the video ad response.

Causing execution of the executable data collection and processing module may comprise calling a resource identifier in the video adresponse, wherein the resource identifier points to the data collection and processing module. Alternatively, the data collection and processing module may itself be an executable application within the served video ad response. Herein a "resource identifier" means any value in the video ad response that is capable of calling the data collection and processing module from another location, e.g. a remote server. The resource identifier may be a uniform resource identifier (URI).

The behavioural data may comprise information indicative of the computer user's emotional state. In one embodiment, this information is obtained by collecting images of the user, in particular images of the user's face. Execution of the data collection and processing module may thus initiate a webcam connected to the client computer, and, where required, prompt activation of the webcam to collect images of the user. The images can be analysed to obtain behavioural information, and in particular emotion state information. Thus, the data collection and processing module may be or include an emotion tracking application. As such the data collection and processing module can comprise instructions executable within the processor of the client computer at which the content is being played which analyses the images and outputs data concerning emotions tracked as a result of the analysis, to be included in data packets sent to the remote server, optionally to be sent within data packets that include other behavioural data being sent to the server.

The data collection and processing module may be arranged to send the collected behavioural data to a remote server for analysis. The data collection and processing module may obtain connectivity with the remote server and control the transmission of data to and from the remote server. These functions may be activatable by the user, e.g. based on appropriate selection of prompts displayed upon execution of the data collection and processing module. The data collection and processing module may be arranged to display a graphical user interface on or adjacent to the video player, e.g. to show the status of the data collection and processing module and/or to allow the user to interact with the data collection and processing module.

The data collection and processing module may be associated with the media that is played back during the collection of images. For example, both the data collection and processing module (or its resource identifier) and the media may be contained in the same video ad response. Alternatively, the data collection and processing module may not be directly associated with the media. For example, the video ad response may contain the data collection and processing module (or its resource identifier) in place of a video ad, i.e. execution of the data collection and processing module is substituted for playing a video ad. In this situation, the media may be obtained from a different source, e.g. another ad server, or may be already present on the video player, e.g. selected by the user from a library or media-sharing website.

The video ad response may have an XML-based structure that is compatible with Video Ad Serving Template (VAST) 3.0 produced by the Interactive Advertising Bureau (IAB).

The data collection and processing module (or its resource identifier) may be provided in a creative element of the VAST response. An advantage of this arrangement is that it can ensure execution of the data collection and processing module on any VAST compatible video player. It may thus not be necessary to tailor the data collection and processing module to a specific video player or to provide within the data collection and processing module the means to detect the video player type and reconfigure itself accordingly.

For example, the video ad response may be a VAST Inline Response, i.e. an ad response which itself includes the video ad to be displayed. In accordance with such an arrangement of the invention, the video ad response may include a media file that provides the media for playback during collection of the images. The media may be of any type, e.g. video content, audio content, etc. The VAST Inline Response may comprise a plurality of sequential Linear Ads forming an Ad Pod. The resource identifier for the data collection and processing module may be provided by or in one of the plurality of sequential Linear Ads. The media for playback during collection of the images may be another of the plurality of sequential Linear Ads, e.g. with a sequence number later than the data collection and processing module. In this way, the VAST structure ensures that the media is played after the initiation sequence of the data collection and processing module is completed.

The resource identifier for the data collection and processing module may be provided by or within a Companion Ad included in the VAST Inline Response. A Companion Ad can be arranged to display or operate separately from media displayed on the video player itself.

The resource identifier for the data collection and processing module may be provided within a CreativeExtension portion of the VAST Inline Response. The CreativeExtension portion is a section of the VAST structure where executable entities, which may need to call a specific application programming interface (API) to operate can be provided.

The VAST Inline Response may comprise a Nonlinear Ad. However, rather than static advertising content, the Nonlinear Ad may include the resource identifier for the data collection and processing module within a Static Resource portion thereof.

As mentioned above, the resource identifier for the data collection and processing module need not be provided together with the media for playback during collection of the images. For example, the video ad response may be a VAST Redirect Response that includes a resource identifier for calling a VAST Inline Response and the data collection and processing module. The media for playback during collection of the image may be present in the called VAST Inline Response, e.g. as a media file. The data collection and processing module itself may be provided by or within a Companion Ad included in the VAST Redirect Response.

In the examples above, the video ad response itself includes the data collection and processing module or a resource identifier for the data collection and processing module. However, in an alternative embodiment, the method may include a step of substituting a media file resource identifier in the video ad response with the resource identifier for the data collection and processing module. In other words, the video player acts to redirect a standard media file request in a manner that executes the data collection and processing module. For example, the resource identifier for the data collection and processing module may be a proxy address that includes the media file resource identifier.

The data collection and processing module includes a media player portion for playback of the media during collection of the images. The media player portion may overlie the video player so that the media appears to run within the video player. Alternatively, playback of the media may be by the video player itself as is conventional.

It may also be possible for the media for playback to lie outside the video ad response environment. In other words the video ad response environment provides for the initiation of the data collection and processing module, whereas the media for playback is a free choice for the user, e.g. from a video-sharing website or social network. In this case, the VAST Inline Response may include a video player interface module for establishing communication between the video player and the data collection and processing module. The video player interface module may be operable to pass information concerning the status of the video player media and/or the media being played to the data collection and processing module. The data collection and processing module may communicate with the video player using a protocol compatible with Video Player Ad-Serving Interface Definition (VPAID) 2.0. The data collection and processing module may communicate directly with the video player or indirectly via the video player interface module.

The invention may be used within a web-based system for collecting and processing data from each of a plurality of users, e.g. located at a plurality of different locations. One advantage of the invention may be to widen the pool of potential users by not required the data collection software to be pre-installed on their local computer system.

As mentioned above, the collected behavioural data may relate to the emotional state of the user viewing the media. Where the collected behavioural data includes facial images of the user, the method may include analysing the facial images to extract information about the user's emotional state. Thus, the behavioural data may include images or video stream from the webcam, mouse movement data, mouse click data, audio data. The data may be partly processed by the data collection and processing module, e.g. to facilitate communication to the analysis server. Other data may also be collected and processed, e.g. user data, questionnaire responses, etc. The collected data can be used to drive market research, e.g. based on measured audience reaction. Collectively, the processing of the computer user behavioural data by the data collection and processing module combines the different information into data packets for a. more efficient data transfer from each local computer to the analysis server resulting an improved usage of computational resources and a more minimized impact on the data upload from each individual local computer.

Analysis of the facial images may be done in any known manner. For example, the analysis may include tracking the movement of one or more specific facial features, e.g. by tracking and identifying a plurality of sub-regions on the detected facial image, which sub-regions may correspond to an area around a facial feature. The movement of the respective facial feature may be tracked by comparing properties of the image within each sub-region to extract parameters that are indicative of changes to the image in the sub-region. An emotion may be determined directly based on the extracted parameters from one or more of the sub-regions. The analysis may also be done by tracking geometrical features only or by performing a combination of the above techniques. The face may be analysed as a whole without splitting it into sub-regions. In certain embodiments, the analysis is performed by the data collection and processing module and causes an output of the analysed data for data transmission to the analysis server.

The analysis may also monitor other user movements or gestures, e.g. upper body movements, head gestures, etc., which can be used alone or in combination with the techniques mentioned above.

In the invention, the data collection and processing module may be arranged to transmit the collected facial images to the analysis server. The data may be sent as a video stream or as a series of extracted (e.g. periodically extracted) images. The images may be the full picture captured by the webcam, or may be pre-processed to extract portions of the image that correspond to facial features or regions to be tracked. Alternatively, a preliminary analysis may be performed on the client computer, by the data collection and processing module, whereby only the pure behavioural data is transmitted.

The analysis server may be arranged to receive input separately or simultaneously from a plurality of data collection and processing modules. The analysis server may be arranged to process the input by analysing the images to extract data representation of one or more emotional states. For example, the analysis may generate an emotion metric for each of six universal emotions, e.g. happiness, sadness, surprise, fear, disgust and, anger. The emotion metrics may be based on geometrical deformations of facial features or changes in the texture of the face or facial features. Additionally or alternatively, these or other emotion metrics may be based on head pose changes, such as head nods, shakes or bobbles or other body gestures, such as hands, shoulders, eyes gestures. These or other emotion metrics may also be based on processing the audio signals received from the subject computer independently or in tandem with the video and other signals commonly measurable on personal computers. The emotional metrics can be transmitted to the remote server in lieu of the raw captured image data for an efficient data transfer from each local computer to the remote server, again resulting an improved usage of computational resources and a more minimized impact on the data upload from each individual local computer.

The analysis may also generate one or more further metrics that may be independent of the emotions or based on other combinations of facial feature movements. For example, the further metrics may include engagement, neutrality and valence.

The analysis server may be arranged to aggregate the metrics calculated for each of a plurality of users. The analysis server may be arranged to display the aggregated metrics, e.g., via an interactive graphical user interface (GUI). The interactive GUI may be accessible to a customer via a weblink. It may update dynamically, e.g. in real time or upon execution of a. refresh operation.

The interactive GUI may present the time evolution of one or more of the aggregated metrics to allow the impact of regions within the presented media to be assessed.

BRIEF DESCRIPTION OF THE DRAWINGS

Examples of the invention are discussed below in detail with reference to the accompanying drawings, in which.

DETAILED DESCRIPTION OF CERTAIN EMBODIMENTS OF THE INVENTION

Figure 1:
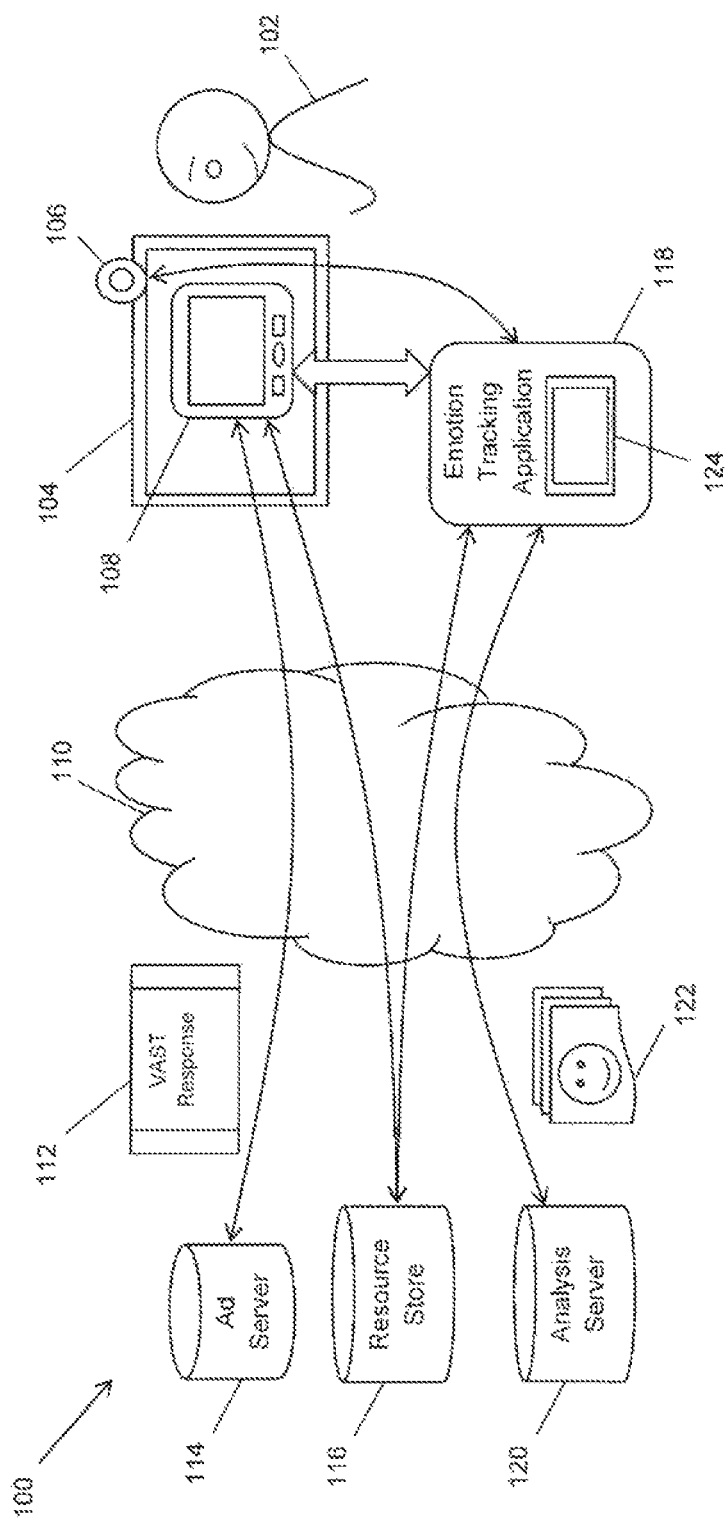
FIG. 1 is a schematic drawing of a system for implementing a method that is an embodiment of the invention.

FIG. 1 depicts the environment 100 within which the present inventions operates. A user 102 views web-based content on a display 104 associated with a network-enabled computer (not shown) using a browser. The computer includes a processor that executes instructions stored in a processor-accessible memory (e.g., RAM) so as to configure the computer to implement at least a portion of the functionality described herein. The computer may thus be capable of sending and receiving data over a network, such as the Internet 110, and, as such, has is understood as having network interface components comprising hardware configured to enable communications over the network, including by way of example and not limitation, data packets constructed in accordance with an IP protocol. The computer or display 104 is connected to or has inbuilt a webcam 106. As is conventional, when the user 102 wishes to view or listen to certain media, a video player 108 (such as, e.g., windows Media Player, QuickTime Player, Audacious, Amarok, Banshee, MPlayer, Rhythmbox, SMPlayer, Totem, VLC, and xine, or an online video player, such as JW Player, Flowplayer and Brightcove) may be launched to playback the media.

According to the invention, the computer calls and receives an ad response 112 from a remote ad server 114. The ad response 112 preferably complies with the VAST specification so that it can be executed within the run time environment of a video player that is compliant with the VAST specification.

The ad response 112 contains an identifier that redirects to a remote resource store 116 which may provide some or all of the content needed to display the called ad. For example, the resource store may provide any media file that is required for running the ad.

According to one embodiment of the invention, the identifier in the ad response is arranged to call a data collection and processing application from the resource store 116. The identifier may be embedded directly in the ad response, e.g., as if the data collection and processing application was the ad being called. Alternatively, the video player may be arranged to insert a call for the data collection and processing application within a conventional call for an ad, e.g., by treating the resource store as a proxy. These alternatives are explained in more detail below.

In other embodiments, the ad response may include the data collection and processing application or an executable data collection and processing module within it.

Upon execution, the data collection and processing application is arranged to provide a data collection and processing function that is described in more detail below. The data collection and processing application may be an emotion tracking application 118 for collecting information indicative of the user's emotional state, and, optionally, also for processing such information to arrive at signals which are indicative of the user's emotional state or which can support a determination of the user's emotional state as a result of further analysis at a remote server, such as the remote analysis server 120. The data collection and processing application may also be arranged to collect (i.e., record) other types of behavioural data. The recorded behavioural data may allow the user's emotions to be tracked during the user's interaction with media played back on the video player 108. For instance, the user's emotions can be tracked using code that configures the processor of the local computer to make determinations of the computer user's emotions, such as the six universal emotions mentioned above. Alternatively, the user's emotions can be tracked using code executing at the analysis server 120 that configures the processor of the that server to make determinations of the computer user's emotions, such as the six universal emotions mentioned above, either using the raw captured image data, or, more preferably, using the signals processed by the emotion tracking application 118 at the local computer prior to transmission to any remote server.

The emotion tracking application 118 may be initialised within the run time environment of the video player 108. Preferably therefore the initialisation steps use a protocol compatible with VPAID. In this embodiment, the initialisation process comprises setting up communication between the emotion tracking application 118 and the webcam 106 to enable captured images to the transferred therebetween. For instance, software (which comprises instructions executing in the processor of the local computer) can be used to set up such communication within the client computer. In addition, the initialisation process comprises setting up (e.g., obtaining authorisation for) communication across the Internet 110 between the emotion tracking application 118 and a remote analysis server 120. For instance, network interface components comprising hardware configured to enable communications over the Internet 110 combined with software, as described, can set up such a process. The captured images 122 (together with any other collected behavioural data or other user data) can thus be sent over the internet to the analysis server 120, where information about the user's emotions can be extracted and used for further processing.

The behavioural data may be captured while the user watches a video or interacts with any other kind of media, which may be played back either on the video player 108 or on a media player 124 embedded within the emotion tracking application 118 itself. An advantage of playback on the embedded media player 124 is that the emotion tracking application has immediate access to information about the media being played at the playback status. If the media is played back on the video player 108, the emotion tracking application 118 needs to establish communication interface with the video player 108 to obtain this information. This possibility is discussed in more detail below.

Figure 2:
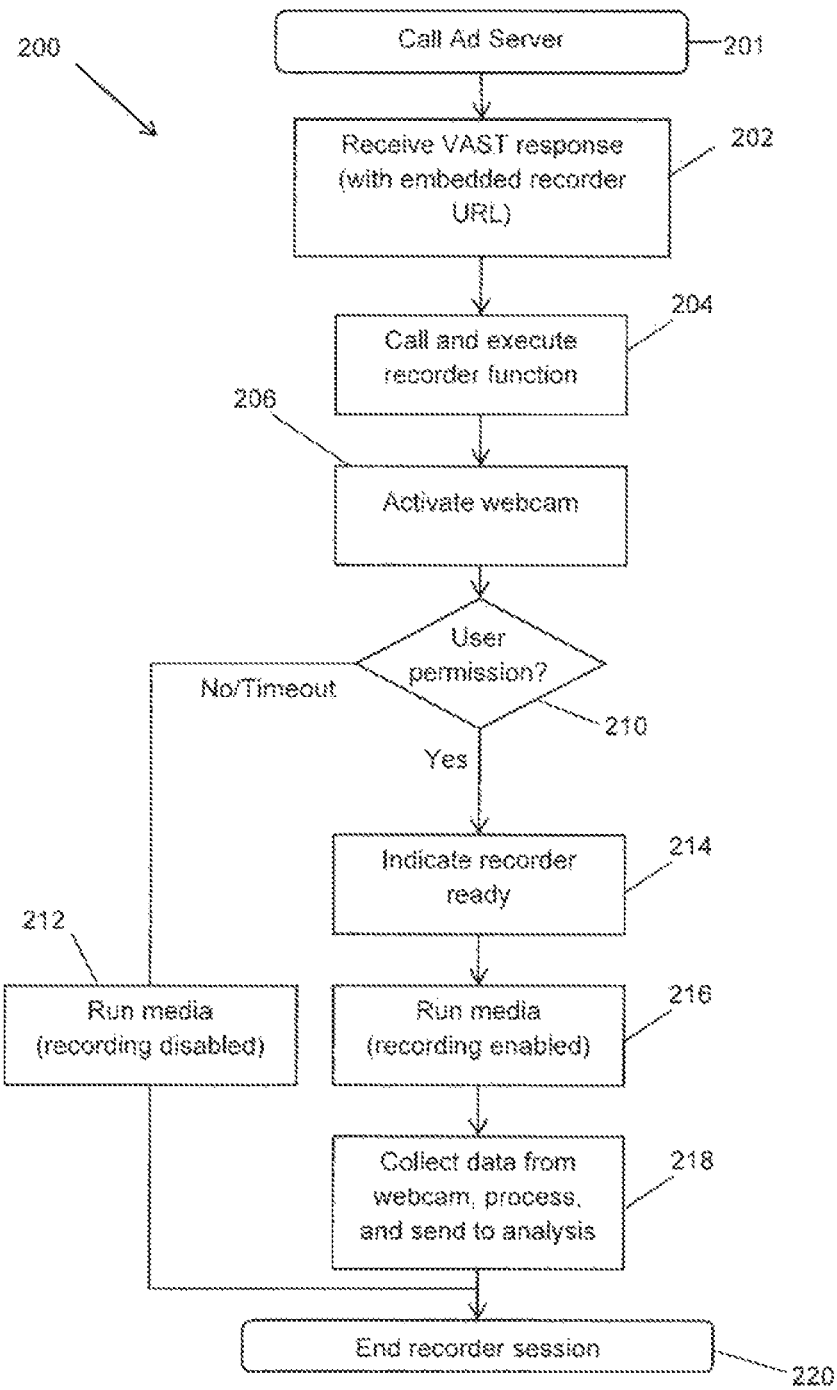
FIG. 2 is a flow chart depicting a method that is an embodiment of the invention.

FIG. 2 is a flow chart 200 depicting the steps of a method for initiating and using the emotion tracking application (referred to below as the "recorder") that is an embodiment of the invention. The method begins with a step 201 of calling an ad from a remote server by a client device, which may be any networked enabled processing unit capable of running a video player. For example, the processing unit may be a PC, smartphone, tablet, wearable electronic device, or the like, more generally, a "client computer," each of which has at least one central processor that can be configured by instructions provided from a memory storage device such as RAM, NVRAM, ROM, an SD card, and so on.

In a second step 202, a VAST compatible response is served to the client device in response to the call for the ad. The VAST compatible response may be a VAST Inline Response (e.g. for conveying one or more media files associated with displaying the ad) or a VAST Redirect Response (e.g. for conveying a resource identifier for calling the ad from another location). In both cases, in this embodiment, the VAST compatible response includes a resource identifier (e.g. a URL) that calls a recorder function for implementing the data collection and processing according to the invention, i.e., the collection and processing of behavioural data of the computer user. The recorder function may thus be embodied as a web-based application available to transfer and execute on a client device. The invention makes use of a conventional standard for requesting video ads to cause the recorder function to be transferred to and executed on a user's device. Since the call for the recorder function is included within the VAST compatible envelope of the response, this step may be performed within the known framework for executing ads, i.e., within the run time environment of the video player. The recorder function can thus be initiated in any VAST compliant video player, and need not be preloaded on the client device.

The purpose of the recorder function is to collect behavioural data about the user as he or she interacts. with media (e.g., a soundclip, video, game or the like), and to process such data to configure it for a more efficient transfer from the client machine to across a network to a server. In one embodiment, the media is a video advertisement, but in principle the media can be of any type. The media may be associated with the call for the recorder function. For example, a media file may be provided in or called by the same VAST response as called the recorder function.

In a third step 204, the video player loads and executes the recorder function. In this embodiment, the recorder function is arranged to collect data indicative of the emotional state of the computer user. Other types of behavioural data may be collected in a similar manner. Execution of the recorder function initiates a step 206 for activating and/or establishing communication with a webcam on the client device. If the webcam is present and active, the method may continue with a step 210 of requesting the user's permission to record and transmit data (image and/or audio) captured by the webcam. If the user denies permission, the recorder session ends. However, in such cases it may still be necessary to show the associated media. Thus, the embedded media player in the recorder application may be arranged to perform a step 212 of playing back the media even if the recording functionality is not enabled. A similar route may be taken if there is no webcam or if the user permission request times out. If the user grants permission, the webcam is fully initialised for use with the recorder.

After the webcam is ready and if user permission is granted, the method continues with a step 214 of indicating, e.g. within the run time environment of the video player, that the recorder function is ready. This indicating step 214 may occur within the VAST framework, e.g. using a suitable tracking event. The indication may simply be used as a trigger to play back or obtain the associated media.

After the video player receives an indication that, the recorder is ready, the method continues with a step 216 of executing a media file. The media file may be a video or audio file. As mentioned above, the media file may be provided with the VAST compatible response, or may be sourced separately. The media may run on the video player itself on or within the recorder application. In the latter case, the recorder application preferably interacts with the underlying video player via the VPAID protocol to pass on tracking events associated with playback of the media.

While the media is running, the method continues with a step 218 of collecting images and/or audio data from the webcam and forward it to the analysis server. As noted previously, the images and/or audio data so collected are processed in order to transform the collected data from a raw capture state to a packetized structure which is compatible with a streaming data protocol for transmission over a network, and in certain embodiments the collected data undergoes additional processing, before transformation into a packetized structure, to coordinate the data that has been collected with particular moments or segments of the media that is running. Such processing can further include synchronizing the images and/or audio being captured with a temporal location within the media being played at the client computer. For instance, synchronization can be a result of by associating a time code (e.g., the value of a time counter at the moment of computer user behavioural data capture taken from a VAST compliant video ad) or range of time codes of the media with the behavioural data being collected, or with information obtained from an analysis of the collected behavioural data, which in certain embodiments is performed at the client computer using the emotion tracking application 118.

This processing can occur as part of step 218, or when an end of recorder session event is detected, as discussed below.

The user may control the media during playback, e.g. using the conventional controls of the video player or via interactive options made available through the recorder application. Control of the recorder may be similarly controlled based on the playback status of the media. For example, if media playback is paused, the recorder may stop sending data to the analysis server. The recorder may be automatically controllable based on the playback status of the media, e.g. based on messages or events received via a VPAID interface with the video player.

When the video player indicates that the media playback has finished, the method may conclude with a final step 220 of terminating the recorder session. The recorder session may also be terminated manually by the user, e.g. via an interactive display. This process may occur within the context of a user's normal interaction with the video player; the video player may be operable independently of the recorder function. In certain embodiments of the invention, instructions executing in the processor of the client machine include monitoring of the status of the media file being played by the video player and can include executable instructions which initiate processing of the collected data, including any synchronization and the transformation to the packetized structure at times when the media file is paused or stopped or when a buffer of the video player exceeds a threshold amount. Such instructions leverage the processing power of individual computer clients and their respective data bandwidth connections to the Internet 110 so as to perform such processing at times when the processing is actively determined to have a low impact on media playback. In particular, a computer client having a slow processor or a low bandwidth connection to the Internet can perform tracking events in real time during playback of a media file while the processing steps are queued to be performed only while media playback is paused, terminated, or at times when the client computer retains a sufficient media playback buffer to process the collected data without disruption of the stream of media playback. For instance, if the buffer reduces by several seconds as a result of a finite amount of data processing, that information is fed back to the collection and processing application (or module(s)) and determinations are made at the client computer as to whether processing can continue without playback disruption, with this testing being performed continuously or periodically during media playback.

Optionally, after processing, the data can be stored on the client computer in the event that a transmission to a remote server cannot be completed at the time of processing, or until such time that the processed data is transmitted to the remote server. A flag or other construct can be utilized (e.g., set for unsent data and reset for sent data, or vice versa) to manage whether an acknowledgement has been received from the remote server that a data transmission from the client computer is complete for a particular piece of content that was played at the client computer. More generally, the data collection and processing application can be further configured by instructions executing in the processor of the client computer to monitor connectivity to the remote server, including Internet connection bandwidth to the remote server, to control the processing of the collected computer user behavioural data and the transmission of the processed data to the remote server. By monitoring external devices (e.g., the remote server) to which the client computer is connected, video impression analysis can be performed with reduced or minimal impact to playback of media at the client computer. This can have particular advantage when the invention of such an embodiment is utilised with mobile devices.

Figure 3:
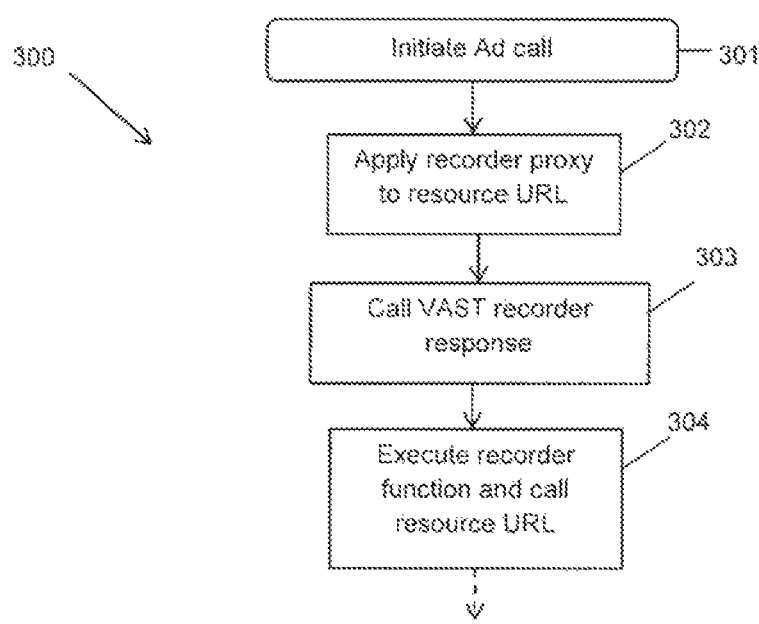
FIG. 3 is a flow chart depicting the initial steps of a method that is another embodiment of the invention.

FIG. 3 is a flow chart showing an alternative method 300 of calling the recorder function. This embodiment differs from the method of FIG. 2 in that the resource identifier that calls the recorder function is not present in the VAST response served in response to the original ad call. Instead, the video player effectively diverts the original ad call via a resource store that provides the recorder function as a proxy. Thus, in this embodiment the video player provider may have control over when and how the recorder function is executed, whereas in the previous embodiment, provision of the recorder function was under the control of the ad response provider.

Thus, the video player provider can arrange for all VAST requests to be sent through a proxy. The proxy provider (who in the invention may also provide the emotion tracking application) may perform the necessary conversions and additions to the VAST response before it is returned to the video player.

In more detail, the alternative method begins with a step 301 of initiating an ad call, i.e., the video player as usual calls a remote ad server, which returns a video ad response. The ad call is directed to the proxy, which, in a second step 302, when the video ad response is received, substitutes all or some of the media file resource identifiers (e.g. URLs) contained in the video ad response with a proxy URL which points to the data collection application. The proxy may transform the VAST response itself to contain references to the data collection application, or it may transformation the media components (i.e. the original media file URLs) so that the data collection application has the original ad embedded within it. The proxy URL may thus be arranged to call the recorder function for execution in the video player whilst also identifying the original resource identifier(s) as providing or containing the associated media to be played back when the recorder function operates.

Following the substitution step 302, the method continues with a third step 303 of calling the proxy address from the video player, which in turn is served a VAST compliant response that provides the recorder function. Upon receipt of the response, the method continues with a fourth step 304 of executing the recorder function in the video player (e.g. following the procedure set out above) and calling the original resource identifier.

Figure 4:
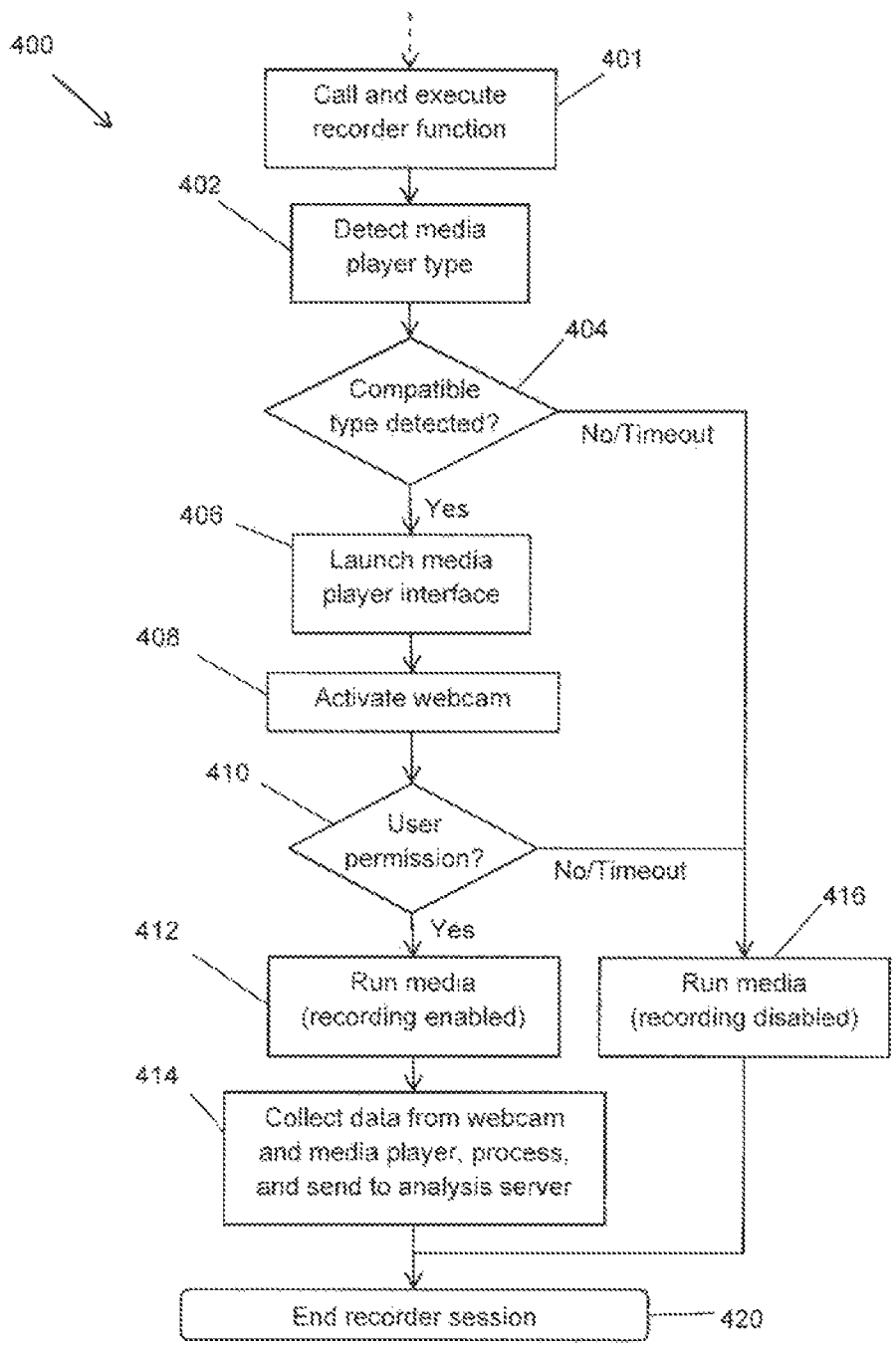
FIG. 4 is a flow chart depicting steps in a method that is another embodiment of the invention.

FIG. 4 is a flow chart showing an alternative method 400 of playing back the associated media. In FIG. 2, playback occurs through a media player functionality embedded in the recorder function. In FIG. 4, playback occurs on the underlying video player, i.e. the video player through with the recorder function is enabled. In such an embodiment, it is not necessary for the recorder function to exhibit the playback functionality. Indeed, in such an embodiment the recorder functionality may have not graphical display portion associated with it (other than perhaps a temporary dialogue for obtaining the user's permission to share data with the analysis server).

The method 400 in FIG. 4 begins with the step 401 of calling and executing the recorder function. In this embodiment, the method includes the step 402 of detecting the type of video player that is making the call. This information may be transmitted with the call for the recorder function e.g. to permit selection of an appropriate response to serve. But more normally it is used in a step 404 of determining if the video player is of a type compatible with the level of interaction required to permit the recording of behavioural data for media played back outside the recorder function. Where the necessary interaction can be carried out within the VPAID standard protocol that governs communications between video ads and video players, the step of detecting a compatible type may be omitted.

If the video player is not of the compatible type or the determining step times out, the method continues with a step 416 of playing back the media without recording any behavioural data. The recorder session is then terminated.

However, if a compatible video player is detected, the method continues with a step 406 of launching a video player interface that is arranged to enable a rich interexchange of data between the video player and the recorder function. For example, the recorder can obtain information about the identity of the media being played back on the player as well as data relating to playback status. The video player interface may be based on the VPAID standard API, although this is not essential.

Following the launch of the video player interface, the method may continue with a step 408 of activating the webcam and a step 410 of obtaining the user's permission to share data with the analysis server. These steps are the same as described above with reference to FIG. 2.

If permission is not granted or the request times out, the method continues with the step 416 of playing back the associated media without recording behavioural data. If permission is granted, the method continues with a step 412 of playing back the associated media. Once playback is underway, the method performs the step 414 of collecting data from the webcam and the video player (via the video player interface) to send to the analysis server, and of processing the collected data as described above.

The method terminates after the associated media has finished playing with a step 420 of ending the recorder session.

Figure 5:
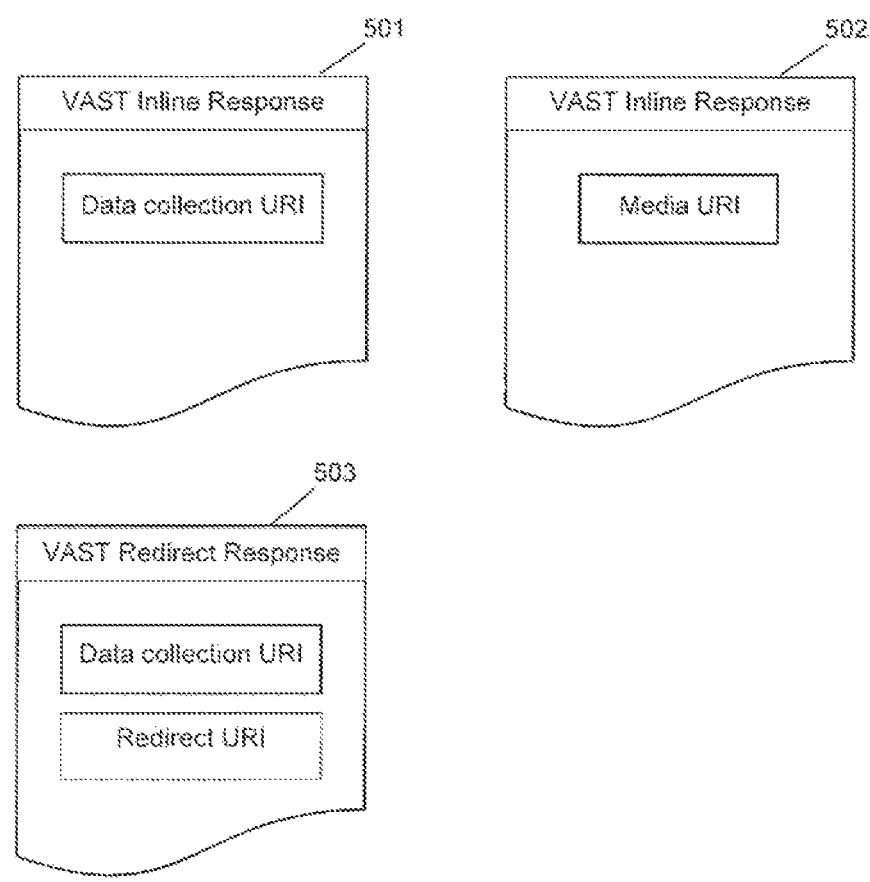
FIG. 5 is a schematic representation of the content of various VAST responses that can be used with the invention.

FIG. 5 shows three schematic representations of VAST compatible responses that can be used with the invention.

In a first example, the VAST compatible response is a VAST Inline response 501 in which a data collection URI is provided in place of the video ad that would appear in a conventional response. The data collection URI calls the behavioural data recording application as described above.

In a second example, the VAST compatible response may be a conventional VAST Inline response 502 having a media URI that indicates a media file to be played back. In this embodiment, the video player may be arranged to recognise the call for a media file and divert that call via a proxy server in order to call the behavioural data recording application In a third example, the VAST compatible response is a VAST Redirect Response (also known as a VAST Wrapper) which includes a data collection URI for calling the behavioural data recording application as well as a redirect URI which points the video player towards a VAST response that will include the media to be played back.

Following analysis of the data sent to the analysis server, embodiments of the invention may be arranged to display the evolution of emotions detected during playback of the media. In practice, data from a plurality of users is combined to produce an aggregated display. Where further information about each user is available (e.g. as metadata to the image data sent to the analysis server), the aggregated data may be filtered or sorted based on such data.

Figure 6:
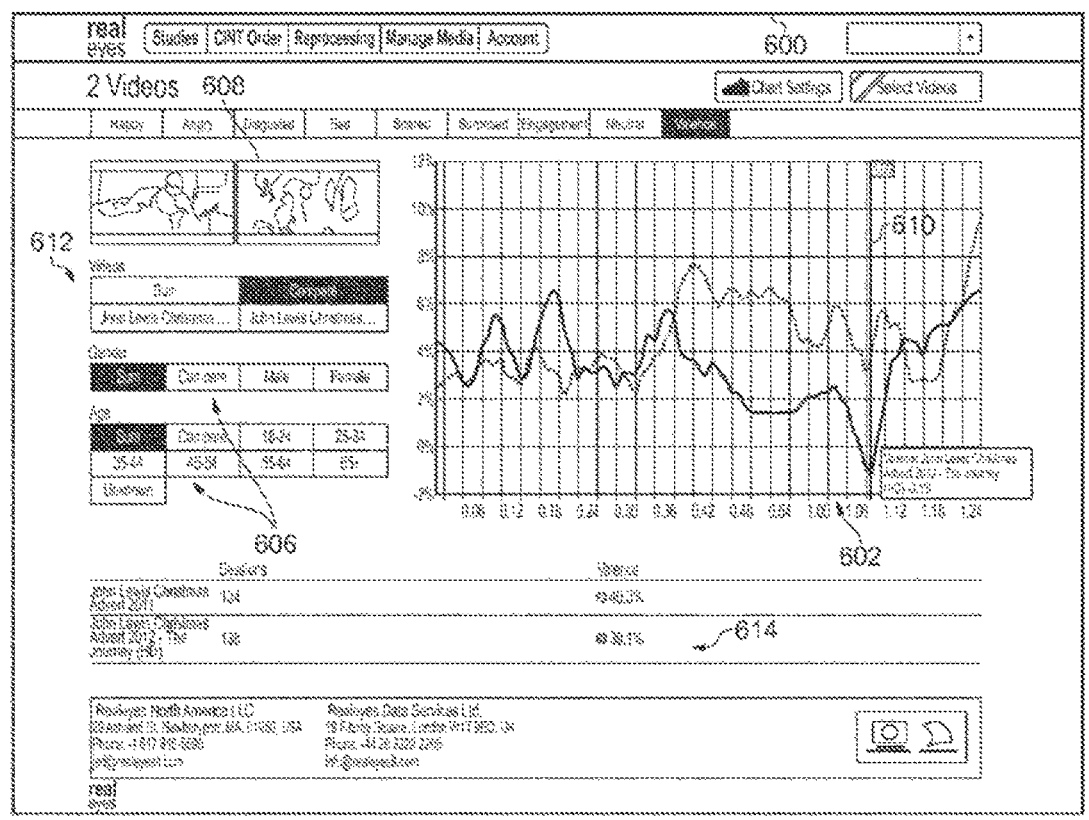
FIG. 6 is a screenshot of a graphical user interface suitable for displaying the results gathered by executing the method of the invention.

FIG. 6 is a screenshot 600 of a graphical user interface suitable for displaying the results gathered by executing the method of the invention. The display includes a graph portion 602 that plots the evolution of one or more emotions with time. The emotion or emotions displayed are selectable on an emotion selection toolbar 604. In this embodiment, the toolbar includes buttons for the six universal emotions, indicated as Happy, Angry, Disgusted, Sad, Scared and Surprise, as well as for metrics indicative of engagement, neutrality and valence, marked as Engagement, Neutral and Valence respectively. In this example, Valence is selected.

The user interface includes a set of filters 606 (in this case based on gender and age) which can refine the displayed data. Embedded in the user interface in this example is a screen shot 608 of the video for which the emotions have been tracked. The screen shot displayed may correspond to the position of a marker 610 on the graph portion 602. The values of the data at the position of the marker are shown in a data display portion 614 beneath the graph portion 602.

The user interface in this embodiment permits data from two videos to be displayed. A display selection portion 612 enables the data to be displayed in different ways. The data may be displayed in combined form by selecting a Sum option, or (as shown in FIG. 6) the data can be directly compared by selected a Compare option. The display selection portion also permits the data of each video to be shown separately.

The invention claimed is:

1. A method in support of an analysis of an impression of media playback on a computer user at a client computer, the client computer being in networked communication with a remote ad server, the method comprising:
 receiving, at the remote ad server from a video player running on the client computer, a call for a video ad response;
 serving, from the remote ad server to the client computer, a video ad response, the video ad response being a data structure comprising computer-executable code configured to both:
 cause a displaying of content on the video player; and
 trigger execution of a data collection and processing module; executing the video ad response in the runtime environment of the video player on the client computer;
 executing the data collection and processing module upon execution of the video ad response in the video player; and upon execution of the data collection and processing module at the video player, collecting and processing behavioural data during playback of media in support of the analysis of the impression of the media playback.

2. The method according to claim 1, wherein executing the data collection and processing module comprises calling a resource identifier contained in the video ad response, wherein the resource identifier points to the data collection and processing module.

3. The method according to claim 1, wherein the data collection and processing module is an executable application within the video ad response.

4. The method according to claim 1, wherein the behavioural data comprises information indicative of the computer user's emotional state.

5. The method according to claim 4, wherein executing the data collection and processing module includes initiating a webcam connected to the client computer, and, where required, prompting activation of the webcam to collect images of the user.

6. The method according to claim 1, comprising the step of sending the behavioural data collected by or derived from the data collection and processing module to a remote server for analysis.

7. The method according to claim 1, wherein executing the data collection and processing module comprises constructing data packets which include information from the processed behavioural data, wherein the data packets correspond to a communication protocol, further comprising the step of transmitting the data packets to a remote server for analysis of the impression on the computer user resulting from the media playback.

8. The method according to claim 7, comprising the steps of: monitoring at least one of a connectivity to the remote server and performance capabilities of the client computer; and dynamically adjusting the processing of the collected behavioural data by the data collection and processing module in accordance with results of the monitoring step.

9. The method according to claim 1, wherein the video ad response includes a media file providing the media for playback during collection of the behavioural data.

10. The method according to claim 1, wherein the video ad response is compliant with a Video Ad Standard Template specification.

11. The method according to claim 10, wherein the video ad response is a VAST Inline Response.

12. The method according to claim 11, wherein the VAST Inline Response includes a media file providing the media for playback during collection of the behavioural data.

13. The method according to claim 1, wherein the data collection and processing module includes a media player portion for playback of the media during collection of the behavioural data.

14. The method according to claim 13, wherein the media for playback is provided outside of the video ad response environment.

15. The method according to claim 14, wherein the media for playback is selected by the user from a video-sharing website or social network.

16. The method according to claim 1, wherein the data collection and processing module includes a video player interface portion for establishing communication between the video player and the data collection and processing module.

17. The method according to claim 1, wherein the data collection and processing module receives information from the video player about the status of playback by the video player.

18. The method according to claim 1, wherein the data collection and processing module communicates with the video player using a protocol compatible with a Video Player Ad-Serving Interface Definition (VPAID).

19. A method in support of an analysis of an impression of media playback on a computer user at a client computer, the client computer being in networked communication with a remote ad server, the method comprising: receiving, at the remote ad server from a video player running on the client computer, a call for a video ad response; serving, from the remote ad server to the client computer, a video ad response, the video ad response comprising computer-readable instructions for display of content on the video player; executing the video ad response in the runtime environment of the video player on the client computer; executing data collection and processing module upon execution of the video ad response in the video player; upon execution of the data collection and processing module at the video player, collecting and processing behavioural data during playback of media in support of the analysis of the impression of the media playback;
wherein executing the data collection and processing module comprises constructing data packets which include information from the processed behavioural data and wherein the data packets correspond to a communication protocol;
transmitting the data packets to a remote server for analysis of the impression on the computer user resulting from the media playback;
monitoring at least one of a connectivity to the remote server and performance capabilities of the client computer; and
dynamically adjusting the processing of the collected behavioural data by the data collection and processing module in accordance with results of the monitoring step.

20. A method in support of an analysis of an impression of media playback on a computer user at a client computer, the client computer being in networked communication with a remote ad server, the method comprising:
receiving, at the remote ad server from a video player running on the client computer, a call for a video ad response;
serving, from the remote ad server to the client computer, a video ad response, the video ad response comprising computer-readable instructions for display of content on the video player and is Video Ad Standard Template ("VAST") Inline Response that is complaint with a VAST specification and includes a media file that provides the media for playback during collection of behavioural data;
executing the video ad response in the runtime environment of the video player on the client computer;
executing data collection and processing module upon execution of the video ad response in the video player;
upon execution of the data collection and processing module at the video player, collecting and processing behavioural data during playback of media in support of the analysis of the impression of the media playback.

* * * * *